Patented May 28, 1929.

1,714,919

UNITED STATES PATENT OFFICE.

JAMES S. MOTTER, OF MILWAUKEE, WISCONSIN.

TIRE DRESSING OR FINISH.

No Drawing.     Application filed May 28, 1927. Serial No. 195,146.

The main object of this invention is to provide an ornamental and protective dressing or finish for rubber goods, such as rubber automobile tires, which penetrates when applied to the surface of the rubber and becomes perfectly bonded therewith.

A further object of the invention is to provide a black dressing or finish for rubber goods such as automobile tires whether new or used, which, when applied to such goods, produces a soft satin-like black finish closely resembling that of a new black tire.

A still further object is to provide a finish or dressing of this type which will not check, is thoroughly waterproof and quick drying, and will prevent penetration of the ultraviolet rays of the sun and oxygen, the most destructive agents to which rubber tires are ordinarily subjected.

This new dressing or finish is compounded by the following process of manufacture and of the ingredients proportioned substantially as set forth therein:—

1. A solution of 15 gallons of a solvent naphtha (which may be either commercial xylol or toluol) with 15 gallons of petroleum spirits having a flash point of 106° F., and specific gravity of 42° Baumé, is placed in a steam jacketed kettle and raised to a temperature of 30° C.;

2. When the said solution is heated to 30° C., fifteen pounds of aluminum palmitate is sifted uniformly into the solution under constant agitation. The temperature of this mixture is then gradually raised under constant agitation to 50° C., when mixture becomes a very heavy, homogeneous, jellylike mass.

3. This mass is then allowed to cool and while the temperature thereof is between 45° C. and 50° C., 10 pounds of black aniline oil dye is added thereto under constant agitation until the dye has become thoroughly dissolved. During this period of the process, the dye reacts (chemically or physically) with the aluminum palmitate and reduces the combination from a jelly-like mass to a thin limpid substance of about the viscosity of linseed oil;

4. While the aforesaid combination is in process of cooling 15 gallons of asphaltum varnish (prepared as hereinafter described) is added thereto and thoroughly mixed therewith until a perfect homogeneous liquid combination is effected;

5. The temperature of the last named liquid combination is then brought up to between 45° C. and 50° C.; and, while held between these temperature limits, the combination has added thereto a solution formed by dissolving $2\frac{13}{16}$ pounds of carnauba wax and $5\frac{5}{8}$ pounds of bayberry wax in 1 gallon of turpentine at a temperature of 100° C.

6. The material resulting from the last proceeding is then passed through a centrifugal clarifier in order to remove any specks, foreign substances, or insoluble matter present in the combination. This completes the process and the dressing resulting therefrom is ready for use.

The asphaltum varnish mentioned in that part of process indicated as number 4 is prepared as follows:

400 pounds of best grade gilsonite is placed in a steam jacketed kettle and has one hundred gallons of petroleum naphtha of specific gravity between 50° and 52° Baumé, added thereto.

This mixture of gilsonite and petroleum naphtha is constantly agitated at a temperature between 90° C. and 100° C., until the gilsonite is thoroughly dissolved, the solution forming an asphaltum varnish uniformly quick drying, of high gloss and excellent density, which combines very effectively with the other ingredients of the dressing or finish.

In the finished dressing, the aniline dye and gilsonite produce an intense black closely resembling hard rubber or gutta percha, the dye staining the rubber, and the gilsonite and dye covering, staining, and waterproofing; the aluminum palmitate produces a false body, waterproofs, and imparts easy working and brushing qualities to the dressing or finish; the waxes produce the satin like surface in the dressing or finish, closely resembling the sheen on hard rubber; the solvent naphtha or coal tar spirits serves as a solvent for the aniline dye, aluminum palmitate and waxes; the solvent naphtha is also a rubber solvent which in the finished dressing, slightly softens the rubber and permits penetration of the rubber surface by the dressing to form a perfect bond between the rubber and dressing; the solvent naphtha is also the vehicle or carrier which makes possible the application of the dressing by hand brush or air brush; and the petroleum spirits serve as reducing agents only.

The great desirability of a rubber dressing or finish of this type in which the ornamental and protective dressing or finish becomes so intimately bonded with the rubber as to become a part thereof, will be obvious to those skilled in the art.

What is claimed is:—

A rubber dressing or finish comprising xylol, petroleum spirits, aluminum palmitate, black aniline oil dye, gilsonite, carnauba and bayberry waxes.

In testimony whereof I affix my signature.

JAMES S. MOTTER.